United States Patent
Akif et al.

(10) Patent No.: US 10,710,529 B2
(45) Date of Patent: Jul. 14, 2020

(54) PEDESTRIAN PROTECTION DEVICE FOR A MOTOR VEHICLE

(71) Applicant: Bayerische Motoren Werke Aktiengesellschaft, Munich (DE)

(72) Inventors: Oeztzan Akif, Munich (DE); Gerhard Fichtinger, Grasbrunn (DE); Wilhelm Riedl, Pfaffenhofen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 36 days.

(21) Appl. No.: 16/001,072

(22) Filed: Jun. 6, 2018

(65) Prior Publication Data

US 2018/0281713 A1    Oct. 4, 2018

Related U.S. Application Data

(63) Continuation of application No. PCT/EP2016/078816, filed on Nov. 25, 2016.

(30) Foreign Application Priority Data

Dec. 7, 2015 (DE) .......................... 10 2015 224 457

(51) Int. Cl.
*B60R 19/04* (2006.01)
*B60R 19/18* (2006.01)
*F16F 7/12* (2006.01)

(52) U.S. Cl.
CPC ................ *B60R 19/18* (2013.01); *F16F 7/12* (2013.01); *B60R 2019/186* (2013.01)

(58) Field of Classification Search
CPC ....... B60R 19/18; B60R 2019/186; F16F 7/12
See application file for complete search history.

(56) References Cited

U.S. PATENT DOCUMENTS 6,866,313 B2   3/2005   Moojjman et al.
6,874,832 B2   4/2005   Evans et al.
(Continued)

FOREIGN PATENT DOCUMENTS

CN    101605677 A    12/2009
CN    103228488 A    7/2013
(Continued)

OTHER PUBLICATIONS

International Search Report (PCT/ISA/210) issued in PCT Application No. PCT/EP2016/078816 dated Jan. 25, 2017 with English translation (seven pages).

(Continued)

*Primary Examiner* — Lori L Lyjak
(74) *Attorney, Agent, or Firm* — Crowell & Moring LLP

(57) ABSTRACT

A pedestrian protection device for a motor vehicle, in particular for a front part of the motor vehicle, includes a bumper crossbeam and a deformation element arranged in front of the bumper crossbeam. The deformation element has a bending section, the end of which is in contact with a surface or which comes into contact with the surface in the event of a collision, in particular a front collision of the motor vehicle. The end of the bending section is designed such that it can move along the surface as a result of the collision, wherein the surface has an engaging device with which the end of the bending section can be, in particular, engaged.

16 Claims, 2 Drawing Sheets

(56) References Cited

U.S. PATENT DOCUMENTS

| | | |
|---|---|---|
| 6,971,690 B2 | 12/2005 | Evans et al. |
| 8,157,066 B2 * | 4/2012 | Murayama .............. B60R 19/18 |
| | | 188/371 |
| 8,267,445 B1 | 9/2012 | Jayasuriya et al. |
| 9,193,319 B2 * | 11/2015 | Kutscher ................. B60R 19/18 |
| 9,731,669 B2 * | 8/2017 | Nagwanshi ............. B60R 19/18 |
| 2008/0185851 A1 | 8/2008 | Evans et al. |
| 2009/0267368 A1 | 10/2009 | Hashimura |
| 2012/0032458 A1 | 2/2012 | Brooks et al. |
| 2013/0300139 A1 | 11/2013 | Fukawatase |
| 2014/0070554 A1 | 3/2014 | Kutscher et al. |

FOREIGN PATENT DOCUMENTS

| | | |
|---|---|---|
| CN | 103241204 A | 8/2013 |
| DE | 100 02 724 A1 | 8/2001 |
| DE | 10 2007 026 032 A1 | 12/2008 |
| DE | 10 2010 054 641 A1 | 6/2012 |
| DE | 102010054641 A1 * | 6/2012 ............. B60R 19/18 |
| DE | 10 2012 112 636 A1 | 7/2014 |
| EP | 2 266 846 A2 | 12/2010 |
| JP | 10-230798 A | 9/1998 |
| JP | 2004-114864 A | 4/2004 |
| WO | WO 2015/097410 A1 | 7/2015 |

OTHER PUBLICATIONS

German-language Written Opinion (PCT/ISA/237) issued in PCT Application No. PCT/EP2016/078816 dated Jan. 25, 2017 (seven pages).

German-language Search Report issued in counterpart German Application No. 10 2015 224 457.1 dated Sep. 16, 2016 with partial English translation (12 pages).

Chinese-language Office Action issued in counterpart Chinese Application No. 201680071142.4 dated Dec. 12, 2019 with English translation(six (6) pages).

* cited by examiner

PEDESTRIAN PROTECTION DEVICE FOR A MOTOR VEHICLE

CROSS REFERENCE TO RELATED APPLICATIONS

This application is a continuation of PCT International Application No. PCT/EP2016/078816, filed Nov. 25, 2016, which claims priority under 35 U.S.C. § 119 from German Patent Application No. 10 2015 224 457.1, filed Dec. 7, 2015, the entire disclosures of which are herein expressly incorporated by reference.

BACKGROUND AND SUMMARY OF THE INVENTION

The present invention relates to a pedestrian protection device for a motor vehicle, comprising a crossmember, in particular a bumper crossmember, and a deformation element, which is arranged in front of the crossmember.

A known front end of a motor vehicle has, for example, a bumper crossmember which is fastened to front ends of longitudinal members or crash boxes, and a bumper cladding. A foam which is deformable at a comparatively low load level is arranged between the bumper cladding and the bumper crossmember in order to protect pedestrians. By this means, in the event of a collision of the motor vehicle with a pedestrian, the pedestrian is protected against direct and immediate collision with a stiff structure, such as the bumper crossmember, located therebehind. The deformable foam has an effect in respect of pedestrian protection in particular within a certain speed range, such as, for example, 20 to 50 km/h.

Furthermore, it is required for the motor vehicle to remain free from damage in a collision in a very low speed range of up to, for example, 4 km/h, in which the pedestrian protection is irrelevant because of the low speed.

Furthermore, at a somewhat higher speed, for example less than 20 km/h, which is likewise still not relevant for pedestrian protection, it is required that damage during a collision be as small as possible and, for example, a radiator structure which is located in the front end region is not to be damaged.

In the event of a collision at a comparatively high speed which is no longer relevant for pedestrian protection, a focus is on designing the motor vehicle and the crash structure thereof for occupant protection. For this purpose, the front end or vehicle front is designed in such a manner that it is deformed in an energy-absorbing manner over a certain deformation distance.

However, the requirements imposed on pedestrian protection are partially contradictory with the requirements at lower or higher speeds. This contradiction can, however, basically be solved by a comparatively long vehicle overhang. However, the long vehicle overhang leads to a greater overall length of the vehicle and also to a higher weight of the vehicle. Furthermore, driving dynamics of the vehicle are disadvantageously affected by the long vehicle overhang.

In order to solve the resulting conflicting objectives, a bumper arrangement with a crossmember which is fastened to the vehicle body via crash boxes has been proposed, for example, in DE 102010054641 A1. A pedestrian protection element for soft impact of a pedestrian is formed in front of the crossmember in the direction of travel. In addition, a pivotable energy absorption element is provided which is pivotable in front of the pedestrian protection element and thereby permits increased energy absorption in collisions in which a higher collision energy absorption capability of the crash structure of the motor vehicle is required.

DE 102012112636 A1 likewise shows a bumper arrangement, including a bumper crossmember and a pedestrian protection element which can be switched over by means of an actuator from a stiff state into a comparatively soft state which serves for pedestrian protection.

A common feature of the bumper arrangements described in DE 102010054641 A1 and DE 102012112636 A1 is that a crash or pre-crash sensor system is required for this purpose, wherein, on the basis of the output signals of the sensor system, a switch can be made between a hard stiff state of the crash structure with high collision energy absorption capability and a soft state of the crash structure with low collision energy absorption capability for the benefit of pedestrian protection.

It is the object of the present invention to provide a pedestrian protection device comprising a bumper crossmember and a deformation element, which is arranged in front of the bumper crossmember, which pedestrian protection device is constructed in a simple manner and is switchable between different rigidities and/or strengths independently of a sensor system or an actuator.

This and other objects are achieved by a pedestrian protection device for a motor vehicle in accordance with embodiments of the invention.

A pedestrian protection device for a motor vehicle, in particular for a front of the motor vehicle, has a crossmember, in particular a bumper crossmember, and a deformation element, which is arranged in front of the crossmember. The deformation element has a bending limb, the end of which lies against a surface or, in the event of a collision, in particular a head-on collision, of the motor vehicle comes to bear against the surface. The end of the bending limb is designed to be displaceable along the surface as a result of the collision, wherein the surface has a latching device with which the end of the bending limb is in particular latchable.

According to the present invention, it is therefore possible for a rigidity of the deformation element to be increased by the bending limb latching into place during deformation of the deformation element as a result of the collision, without a collision sensor system or an actuator system being required here. The collision load itself therefore brings about a stiffening of the deformation element.

The term latchable into place is used in the sense of a form-fitting engagement of the end of the bending limb with the latching device.

Within the context of the invention, the term pedestrian also includes other traffic participants or non-occupants, for example cyclists. Accordingly, the device could also be called non-occupant protection device.

The end of the bending limb is in particular a free end of the bending limb.

The specification "in front of the crossmember" means in particular that the deformation element is arranged on an outer side of the crossmember, i.e. a side of the crossmember that faces an outer skin of the body, for example in the form of a bumper cladding. Furthermore, the outer side of the crossmember can be the side which faces the direction from which a collision load can be anticipated.

According to a preferred development of the present invention, the bending limb, the end of the bending limb, the surface and the latching device are designed in an interacting manner such that, in the event of a collision impulse which is smaller than a predetermined collision impulse or collision impulse threshold value, the end of the bending limb latches with the latching device, and, in the event of a collision impulse which is equal to or greater than the predetermined collision impulse or collision impulse threshold value, the end of the bending limb does not latch with the latching device, and in particular passes or jumps over the latching device, and is therefore displaceable further. In particular, in the latter case, the end of the bending limb can be displaceable or shiftable further along the surface.

Therefore, with simple means and using the collision impulse, the deformation element can have a less stiff, soft state, in which the bending limb or the end of the bending limb is not latched into place, or a stiffer, hard state, in which the end of the bending limb is latched into place, depending on the collision impulse. According to a preferred development of the pedestrian protection device, in the event of a collision, when the front end of the bending limb is latched into place, the deformation element is deformable at a higher force level or undergoes brittle failure in the event of the higher force level, wherein, when the front end of the bending limb is latched into place, the deformation element is deformable at a higher force level or undergoes brittle failure at a higher force level.

The surface is preferably arranged substantially transversely with respect to a (main) collision direction or at least parallel to a vertical direction of the vehicle. In particular, the surface can be arranged substantially transversely with respect to a main driving direction of the motor vehicle. As an alternative definition, the displacement direction of the end of the bending limb runs transversely, preferably substantially perpendicularly, with respect to a collision direction. The collision direction is the direction from which a collision load from a collision counterpart should be expected.

The surface can be a flat surface. However, the surface can also have a different shape. For example, the surface can have a step in the region of the latching device. The surface can also be corrugated in a suitable manner.

Furthermore, the surface can have an activation slope at a point between the end of the bending limb and the latching device, the activation slope supporting the end of the bending limb here in that, from the predetermined collision impulse, said end jumps over the latching device and permits deformation of the deformation element at a low load level.

The surface can be formed on the crossmember or on a part mounted on the crossmember. The surface can be, for example, part of the crossmember. In particular, the surface can be formed in a closing plate of a profiled crossmember.

The deformation element can be of substantially arcuate and/or U-shaped and/or V-shaped design or the like.

The deformation element can be formed integrally from a deformed sheet. A deformation element of this type can easily be produced, is cost-effective and can have a low weight. However, the deformation element can also consist of a plurality of parts which are connected to one another.

Furthermore, the bending limb can be connected to the deformation element in an articulated manner.

A plurality of deformation elements can be arranged spaced apart from one another in the transverse direction of the vehicle in front of the crossmember. The collision-dependent deformation effect can therefore be achieved over an entire extent of the crossmember. However, a plurality of deformation elements can also be connected to form one deformation element. A deformation element of this type correspondingly has a plurality of bending limbs. This facilitates installation.

According to a preferred embodiment, the depression can be a groove. A groove can be formed simply and cost-effectively in a crossmember. For example, the groove can run along the crossmember in the transverse direction of the vehicle substantially over an entire width of the crossmember.

The deformation element can have a length of 50 to 150 mm, preferably 70 to 110 mm, in the collision direction and/or longitudinal direction. This length is relevant in particular for pedestrian protection.

The deformation element is preferably arranged between the crossmember and a body outer skin, for example a bumper cladding. A deformation region of the deformation element is formed between the crossmember and the body outer skin. The deformation element can therefore directly affect its action in the event of the collision.

The deformation element is preferably formed from steel or aluminum or an aluminum alloy, but can also be formed from a fiber-reinforced plastic.

Abovementioned developments of the inventions can be combined as desired with one another insofar as possible and expedient.

Other objects, advantages and novel features of the present invention will become apparent from the following detailed description of one or more preferred embodiments when considered in conjunction with the accompanying drawings.

DETAILED DESCRIPTION OF THE DRAWINGS

An exemplary embodiment of the present invention is described below with reference to FIGS. 1 to 4.

Figure 1:
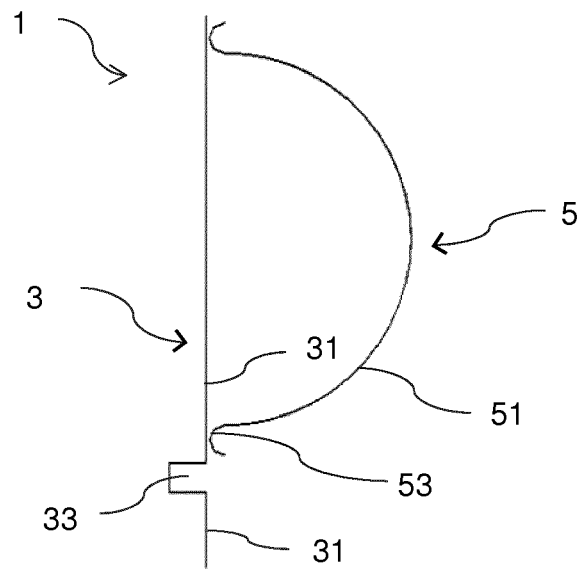
FIG. 1 is a schematic section side view of a pedestrian protection device according to an exemplary embodiment of the present invention.
Figure 2:
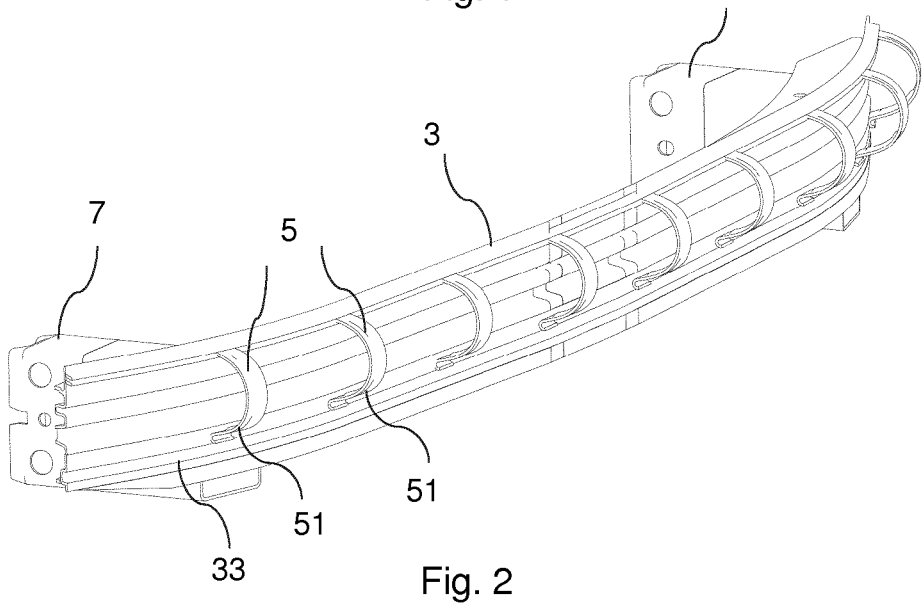
FIG. 2 is a schematic perspective view of the pedestrian protection device according to the exemplary embodiment of the present invention.

As is shown in the schematic sectional view in FIG. 1, a pedestrian protection device 1 of a motor vehicle, in particular a passenger motor vehicle, has, according to the exemplary embodiment of the present invention, a front bumper crossmember 3 and a deformation element 5 which is arranged in front of the front bumper crossmember 3. A surface 31 directed substantially forward or outward is formed on the front bumper crossmember 3. The surface 31 is formed substantially parallel to a vertical direction of the vehicle and is formed mainly perpendicularly to a longitudinal direction of the vehicle, wherein the bumper crossmember 3 together with the surface 31 can also be bent somewhat rearward at its end portions, as shown in FIG. 2, and therefore the surface 31 in particular in this region cannot be formed perpendicularly to the longitudinal direction of the vehicle. A depression according to the invention in the form of a rectangular groove 33 is formed in the surface 31.

The deformation element 3 is formed in an arcuate manner from a deformed sheet and has a bending limb 51, the front end 53 of which is in contact with the surface 31. The other end of the arcuate deformation element 5 is suitably connected to the bumper crossmember 3 in a form-fitting, integrally bonded or/and frictionally locking manner.

As is shown in FIG. 2, a plurality of deformation elements 5 are arranged spaced apart from one another in the transverse direction of the vehicle over an entire width of the bumper crossmember 3. The bumper crossmember 3 is fastened to the vehicle body via crash boxes 7 on a left longitudinal member and a right longitudinal member, which are not shown in FIG. 2. The surface 31 and the groove 33 likewise extend over an entire width of the bumper crossmember 3.

A function of the pedestrian protection device 1 and a differing rigidity behavior of the pedestrian protection device 1 are described below with reference to FIGS. 3 and 4.

In the event of a collision, in particular a head-on collision of the motor vehicle, in which a load 9 acts substantially in the longitudinal direction of the vehicle, the deformation element 5 is stressed in the direction of the bumper crossmember 3. In other words, the deformation element 5 is pressed in the collision direction, see the direction arrows in FIGS. 3 and 4, toward the bumper crossmember 3. As a result, the bending limb 51, in particular the end of the bending limb 53, is pressed, in the present case downward, along the surface 31 transversely with respect to the bumper crossmember 3, while the deformation element 5 is compressed or deformed. During the collision, the end of the bending limb 53 is therefore moved transversely with respect to the bumper crossmember 3 or the surface 31 on the bumper crossmember 3.

Figure 3:
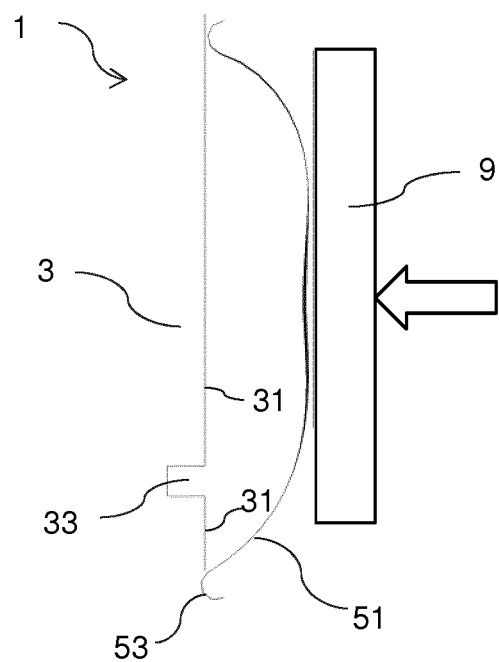
FIG. 3 is a schematic section side view of the pedestrian protection device according to the exemplary embodiment of the present invention in the event of a collision with a high collision impulse.

FIG. 3 shows a head-on collision of the motor vehicle with a pedestrian and a corresponding deformation of the deformation element 5 at a speed within a range of approximately 20 km/h to approximately 50 km/h. The deformation element 5 and the bumper crossmember 3 are configured in an interacting manner such that, in the event of said head-on collision of the motor vehicle with a pedestrian at the speed of above 20 km/h, i.e. with a collision impulse above a collision impulse threshold value, the end 53 of the bending limb 51 slides along the surface 31 and then jumps over the groove 33 and therefore does not latch into place therein. After jumping over the groove 33, the bending limb 51 can slide further along the surface 31 while the collision load 9 continues to press the deformation element 5 further in the direction of the bumper crossmember 3 or the surface 31 and correspondingly deforms said deformation element.

A load at which the deformation element 5 is deformed here is relatively low because of the lack of an engagement/latching into place of the bending limb 51 or of the end 53 of the bending limb 51 in the groove. The deformation element 5 can therefore meet the requirements of pedestrian protection within a speed range of 20 to 50 km/h.

Figure 4:
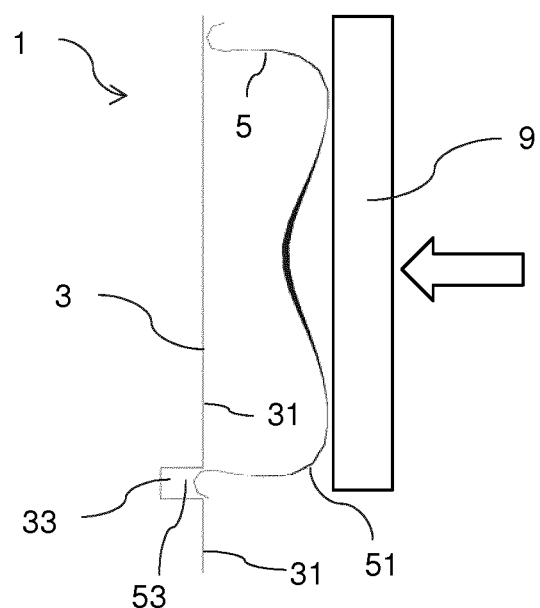
FIG. 4 is a schematic section side view of the pedestrian protection device according to the exemplary embodiment of the present invention in the event of a collision with a low collision impulse.

FIG. 4 shows a head-on collision of the motor vehicle in the case in which the motor vehicle collides at a lower speed, i.e. at a speed of less than 20 km/h, wherein said low speed is less relevant for pedestrian protection. In a manner corresponding to the lower speed, the collision impulse here is lower, and therefore, in the event of deformation of the deformation element 5 as a result of the collision load 9, the front end 53 of the bending limb 51 does not jump over the groove 33, but rather latches into place in a form-fitting manner in the groove 33. The deformation element 5 is configured in such a manner that deformation of the deformation element 5 in the collision direction, i.e. toward the bumper crossmember, is thereby made significantly more difficult and therefore the deformation of the deformation element 5 takes place at a substantially higher force level because of the form-fitting engagement of the deformation element 5 in the groove 33. The deformation element 5 can sufficiently absorb collision energy here by means of deformation and optionally brittle failure, and therefore motor vehicle elements arranged behind the bumper crossmember 3, such as, for example, a radiator, are not damaged. An outlay on repair in the event of collisions at low speeds is therefore kept low.

According to alternative exemplary embodiments of the present invention, it is also possible for the two limbs of the arcuate deformation element to be designed as bending limbs which, in the event of the collision, is deformable in mutually opposed directions and are latchable into place different depressions.

Furthermore, it is possible for a plurality of or all the deformation elements to be connected to one another to form a single deformation element which has a plurality of bending limbs.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pedestrian protection device for a motor vehicle, comprising:
   a crossmember; and
   a deformation element, which is arranged in front of the crossmember, wherein
   the deformation element has a bending limb, an end of which lies against a surface or, in an event of a collision of the motor vehicle, comes to bear against the surface, and
   the end of the bending limb is configured to be displaceable along the surface as a result of the collision, wherein a latching device to which the end of the bending limb is latchable is formed on the surface.

2. The pedestrian protection device as claimed in claim 1, wherein
   the bending limb, the end of the bending limb, the surface and the latching device are configured in an interacting manner such that:
   in the event of a collision impulse which is less than a predetermined collision impulse, the end of the bending limb latches with the latching device, and
   in the event of a collision impulse which is equal to or greater than the predetermined collision impulse, the end of the bending limb does not latch with the latching device and is displaceable further.

3. The pedestrian protection device as claimed in claim 2, wherein
   in the event of a collision, when the end of the bending limb is latched with the latching device, the deformation element is deformable at a higher force level or undergoes brittle failure, and when the end of the bending limb does not latch with the latching device, the deformation element is deformable at a lower force level or undergoes brittle failure.

4. The pedestrian protection device as claimed in claim 1, wherein
   the surface is arranged substantially transversely with respect to a collision direction.

5. The pedestrian protection device as claimed in claim 4, wherein
   the surface is substantially perpendicular with respect to a main direction of travel of the motor vehicle.
6. The pedestrian protection device as claimed in claim 1, wherein
   the surface is formed on the crossmember.
7. The pedestrian protection device as claimed in claim 6, wherein
   the surface is part of the crossmember.
8. The pedestrian protection device as claimed in claim 1, wherein
   the deformation element is of substantially arcuate design.
9. The pedestrian protection device as claimed in claim 1, wherein
   the deformation element is formed from a deformed sheet.
10. The pedestrian protection device as claimed in claim 1, wherein
    the deformation is integrally formed by a deformed sheet.
11. The pedestrian protection device as claimed in claim 1, wherein
    a multiplicity of deformation elements are arranged spaced apart from one another in the transverse direction of the vehicle in front of the crossmember.
12. The pedestrian protection device as claimed in claim 1, wherein
    the latching device is a depression in which the end of the bending limb is engageable in a form-fitting manner.
13. The pedestrian protection device as claimed in claim 12, wherein
    the latching device is a groove in which the end of the bending limb is engageable.
14. The pedestrian protection device as claimed in claim 1, wherein
    the deformation element has a length of 50 to 150 mm in the collision direction and/or in the longitudinal direction.
15. The pedestrian protection device as claimed in claim 14, wherein
    the deformation element has a length of 70 to 110 mm in the collision direction and/or in the longitudinal direction.
16. The pedestrian protection device as claimed in claim 8, wherein
    the substantially arcuate design is a U-shape.

* * * * *